United States Patent
Diab et al.

(10) Patent No.: US 9,088,434 B2
(45) Date of Patent: Jul. 21, 2015

(54) SYSTEM AND METHOD FOR POWER OVER ETHERNET POWER MODE POLICY AND NETWORK MANAGEMENT

(75) Inventors: Wael William Diab, San Francisco, CA (US); Andy Fung, Vancouver, CA (US)

(73) Assignee: BROADCOM CORPORATION, Irvine, CA (US)

( * ) Notice: Subject to any disclaimer, the term of this patent is extended or adjusted under 35 U.S.C. 154(b) by 944 days.

(21) Appl. No.: 12/433,044

(22) Filed: Apr. 30, 2009

(65) Prior Publication Data

US 2010/0205466 A1    Aug. 12, 2010

Related U.S. Application Data (60) Provisional application No. 61/150,400, filed on Feb. 6, 2009.

(51) Int. Cl.
  *G06F 1/32* (2006.01)
  *H04L 12/40* (2006.01)
  *H04L 12/24* (2006.01)

(52) U.S. Cl.
  CPC ........ *H04L 12/40045* (2013.01); *G06F 1/3203* (2013.01); *H04L 41/0813* (2013.01); *H04L 41/0213* (2013.01); *H04L 41/046* (2013.01)

(58) Field of Classification Search
  CPC ..................... H04L 12/40045; H04L 41/0813; G06F 1/3203
  USPC .......................................................... 713/310
  See application file for complete search history.

(56) References Cited

U.S. PATENT DOCUMENTS

| | | | |
|---|---|---|---|
| 7,650,519 B1 * | 1/2010 | Hobbs et al. | 713/300 |
| 2006/0005056 A1 * | 1/2006 | Nishioka | 713/300 |
| 2007/0110360 A1 * | 5/2007 | Stanford | 385/14 |
| 2007/0220280 A1 * | 9/2007 | Karam et al. | 713/300 |
| 2007/0277049 A1 * | 11/2007 | Hansalia | 713/321 |
| 2008/0256373 A1 * | 10/2008 | Diab | 713/310 |
| 2008/0296974 A1 * | 12/2008 | Hsieh | 307/66 |
| 2009/0031152 A1 * | 1/2009 | Bolderl-Ermel et al. | 713/300 |
| 2009/0164810 A1 * | 6/2009 | Kyro et al. | 713/310 |
| 2009/0249112 A1 * | 10/2009 | Diab | 714/2 |
| 2009/0299538 A1 * | 12/2009 | Suzuki | 700/292 |
| 2009/0327766 A1 * | 12/2009 | Ghoshal et al. | 713/300 |
| 2010/0031070 A1 * | 2/2010 | Tomomitsu | 713/300 |
| 2010/0064162 A1 * | 3/2010 | Rotem et al. | 713/340 |

* cited by examiner

Primary Examiner — Nimesh G Patel (74) Attorney, Agent, or Firm — Foley & Lardner LLP; Christopher J. McKenna; Angela D. Murch (57) ABSTRACT

A system and method for power over Ethernet (PoE) power mode policy and network management. Various power modes or configurations can be defined for a powered device. An IT manager at a network management station can remotely configure a power mode or configuration of a powered device using a network management protocol such as SNMP. This network management protocol can instruct a software agent at a powered device to change a power mode or configuration.

10 Claims, 5 Drawing Sheets

SYSTEM AND METHOD FOR POWER OVER ETHERNET POWER MODE POLICY AND NETWORK MANAGEMENT

This application claims priority to provisional application No. 61/150,400, filed Feb. 6, 2009, which is incorporated by reference herein, in its entirety, for all purposes.

BACKGROUND

1. Field of the Invention

The present invention relates generally to power over Ethernet (PoE) and, more particularly, to a system and method for PoE power mode policy and network management.

2. Introduction

In a PoE application such as that described in the IEEE 802.3af and 802.3at specifications, a power sourcing equipment (PSE) can deliver power to a powered device (PD) over Ethernet cabling. Various types of PDs exist, including voice over IP (VoIP) phones, wireless LAN access points, Bluetooth access points, network cameras, computing devices, etc.

In accordance with IEEE 802.3af, a PSE can deliver up to 15.4 W of power to a single PD over two wire pairs. In accordance with IEEE 802.3at, on the other hand, a PSE may be able to deliver up to 30 W of power to a single PD over two wire pairs. Other proprietary solutions can potentially deliver higher or different levels of power to a PD. A PSE may also be configured to deliver power to a PD using four wire pairs.

Conventional PDs are often hardcoded as to how much power that they will draw from the PSE switch. In this hardware-based classification scheme, the switch would determine whether it can fit this amount of power into its fixed total power budget. If this needed power can be accommodated within the PSE switch's fixed total power budget, then the switch will allocate the requested amount of power to the PD. In 802.3at systems, Layer 2 mechanisms have been developed that enables dynamic power classification. This dynamic power classification is an improvement over hardware-based classification schemes and allows for the renegotiation of power between the PD and PSE. What is needed, however, is a mechanism that enables an IT manager to manage effectively a network of PDs.

SUMMARY

A system and method for PoE power mode policy and network management, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In an enterprise environment, a PoE system can be used to power a network of powered devices (PDs), such as VoIP phones. Conventionally, the management of the delivery of power to such devices is based on the responses to individual power requests that are launched by those devices. In this framework, a PSE switch would analyze the individual power requests based on a particular control policy that governs the delivery of the total power budget available to that PSE switch.

A disadvantage of such a management framework is the limited scope by which a power decision is made. Here, the control policy is a bottom-up policy where control decisions are responsive to low-level power requests. In contrast to conventional management frameworks, the principles of the present invention enable a top-down control policy that provides better load balancing through global management. Prior to describing the details of the present invention, reference is first made to FIG. 1, which illustrates an embodiment of a PoE system.

Figure 1:
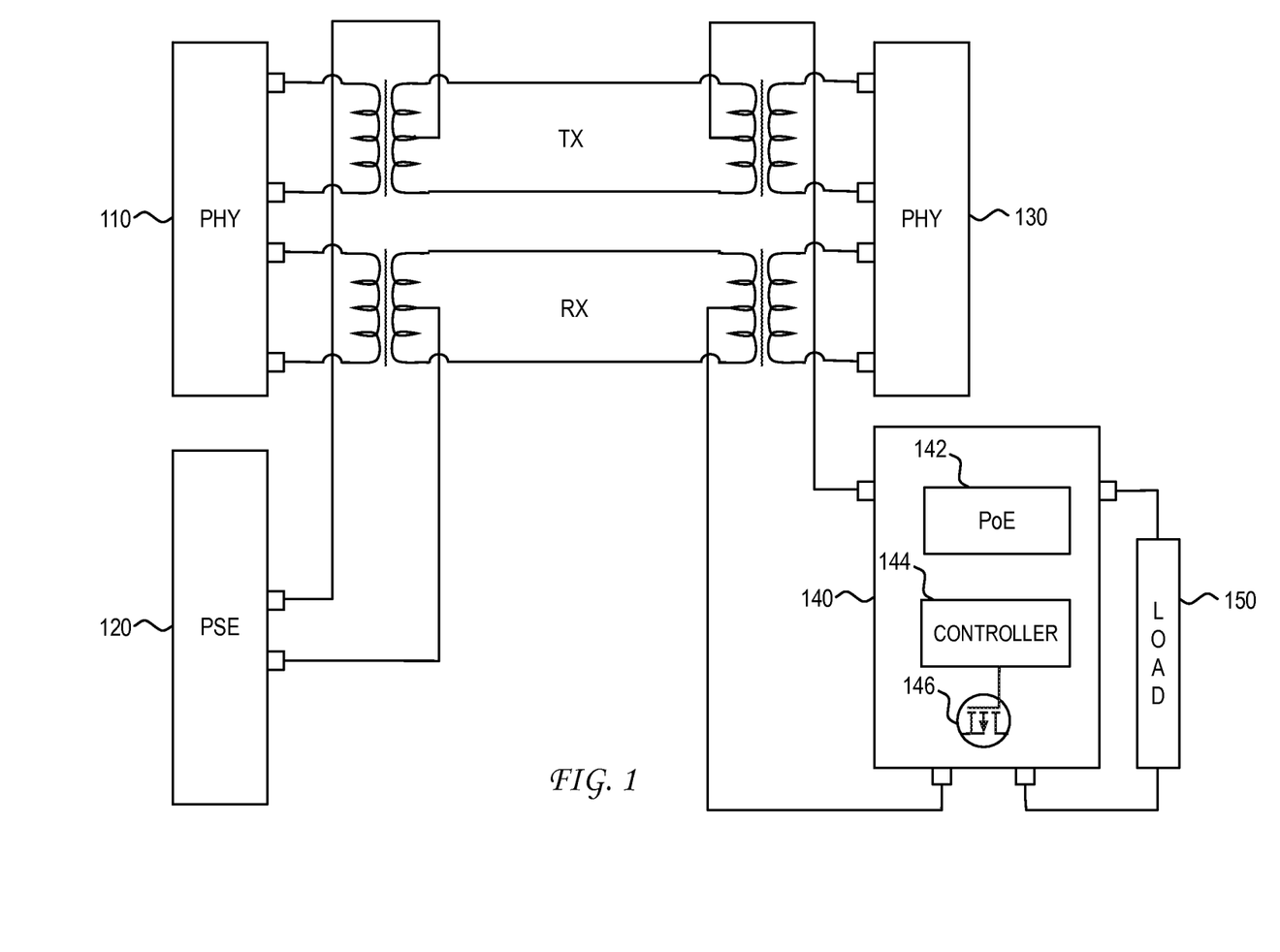
FIG. 1 illustrates an embodiment of a PoE system.

As illustrated, the PoE system of FIG. 1 includes PSE 120 that transmits power to powered device (PD) 140 over two wire pairs. Power delivered by the PSE to the PD is provided through the application of a voltage across the center taps of a first transformer that is coupled to a transmit (TX) wire pair and a second transformer that is coupled to a receive (RX) wire pair carried within an Ethernet cable. In general, the TX/RX pairs can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other Layer 2 PHY technology. Here, it should be noted that PoE does not require the presence of a PHY.

As is further illustrated in FIG. 1, PD 140 includes PoE module 142. PoE module 142 includes the electronics that would enable PD 140 to communicate with PSE 120 in accordance with a PoE specification such as IEEE 802.3af (PoE), 802.3at (PoE Plus), legacy PoE transmission, or any other type of PoE transmission. PD 140 also includes controller 144 (e.g., pulse width modulation DC:DC controller) that controls power transistor (e.g., FET) 146, which in turn provides constant power to load 150.

Figure 2:
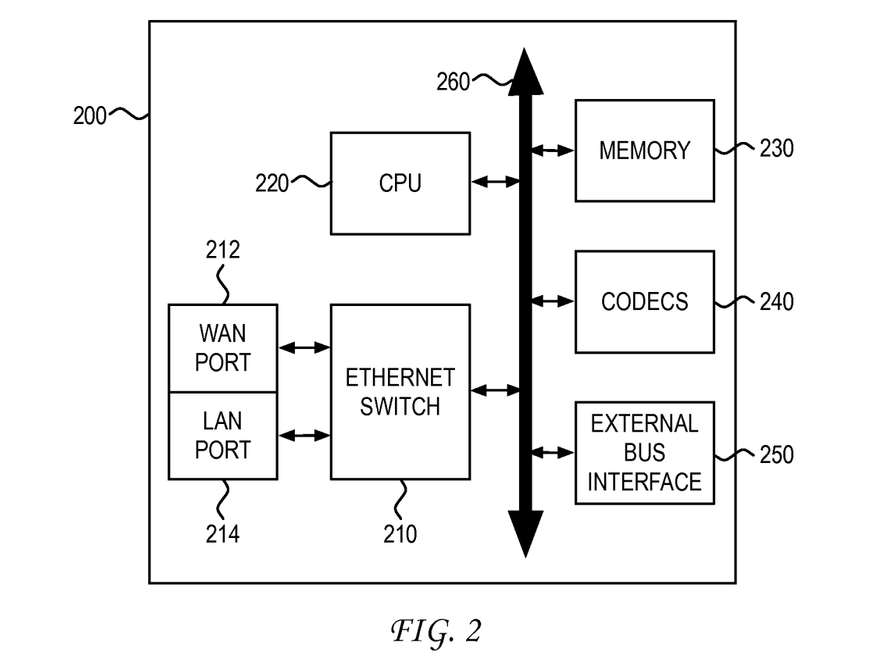
FIG. 2 illustrates an embodiment of a PD.

As noted, one example of a PD is a VoIP phone. FIG. 2 illustrates an example embodiment of such a device. As illustrated, VoIP phone 200 includes a wide area network (WAN) port 212 through which VoIP phone 200 can receive power from a PSE switch over an Ethernet cable. VoIP phone 200 also includes a local area network (LAN) port 214. Both WAN port 212 and LAN port 214 are coupled to Ethernet switch 210, which can be designed with integrated media access controllers (MACs) for the external ports. Ethernet switch 210 is also coupled to internal bus 260. As illustrated, internal bus 260 further couples additional VoIP phone components such as CPU 220, memory 230, coder/decoders (CODECs) 240, and external bus interface 250.

In a conventional PoE framework, the power provisioned by the switch to the VoIP phone through WAN port 212 is based on a conventional hardware classification. In an example IEEE 802.3af process, the PSE, upon discovery of a valid PD, would seek to classify the PSE into one of five predefined power classes. If a particular power class is identified for a particular PD, then the PSE can choose to allocate the appropriate power for that PD. With IEEE 802.3 at systems, a Layer 2 mechanism can be used in place of such a hardware classification process and/or be used to renegotiate a power allocated to the PD.

In the example of a VoIP phone, numerous power modes can exist. For example, a first power mode can be attributed to normal VoIP operation, while a second power mode can be attributed to VoIP operation plus the powering of additional devices (e.g., PDA, mobile phone, etc.) via external bus interface 250 (e.g., USB). As would be appreciated, various additional power modes can be defined that introduce further power options such as the speed of the port/switch (e.g., gigabit, 10/100, etc.), LCD display levels, etc.

With conventional power management techniques, significant management limitations exist due to the reliance on individual powering decisions during classification and/or power renegotiation for the PD. In the present invention, management of the powering of a network of PDs can be located in the network (e.g., distributed) through the use of a network management protocol such as the Simple Network Management Protocol (SNMP).

Figure 3:
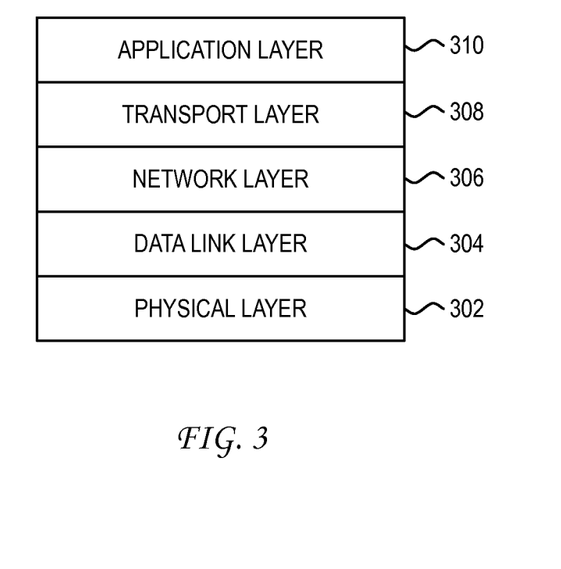
FIG. 3 illustrates a network protocol stack.

In general, the network management protocol can reside in the application layer, which as illustrated in FIG. 3, is part of a network management protocol stack that contains application layer 310, transport layer 308, network layer 306, data link layer 304, and physical layer 302. In general, the network monitoring application in application layer 310 would make use of the services of standard transport protocols such as transmission control protocol (TCP) and user datagram protocol (UDP) contained within transport layer 308. TCP and UDP, in turn, make use of standard services of Internet protocol (IP) at network layer 306. Finally, data link layer 304 specifies the protocol for communicating frames of data between various network stations using the transport protocol, and physical layer 302 translates communications requests from data link layer 304 into hardware-specific operations to affect transmission or reception of electronic signals.

It is a feature of the present invention that an IT administrator or application can use the network management protocol to proactively change a power mode of the PD remotely. To illustrate this feature of the present invention, reference is now made to the example implementation of FIG. 4. As illustrated, a plurality of PDs 420 can be managed by a single network management station 410. This management function within network management station 410 can be enabled using user interface 412, which can control network management application 414. Network management application 414, in turn, communicates with agents 422 in various PDs 420 over network 430. Here, agent 422 is a software module that can be operative to monitor and manage elements of a PD. More specifically, for a given PD 420, agent 422 can interact with management information base (MIB) 424, which is a collection of managed objects residing in a virtual information store.

Figure 4:
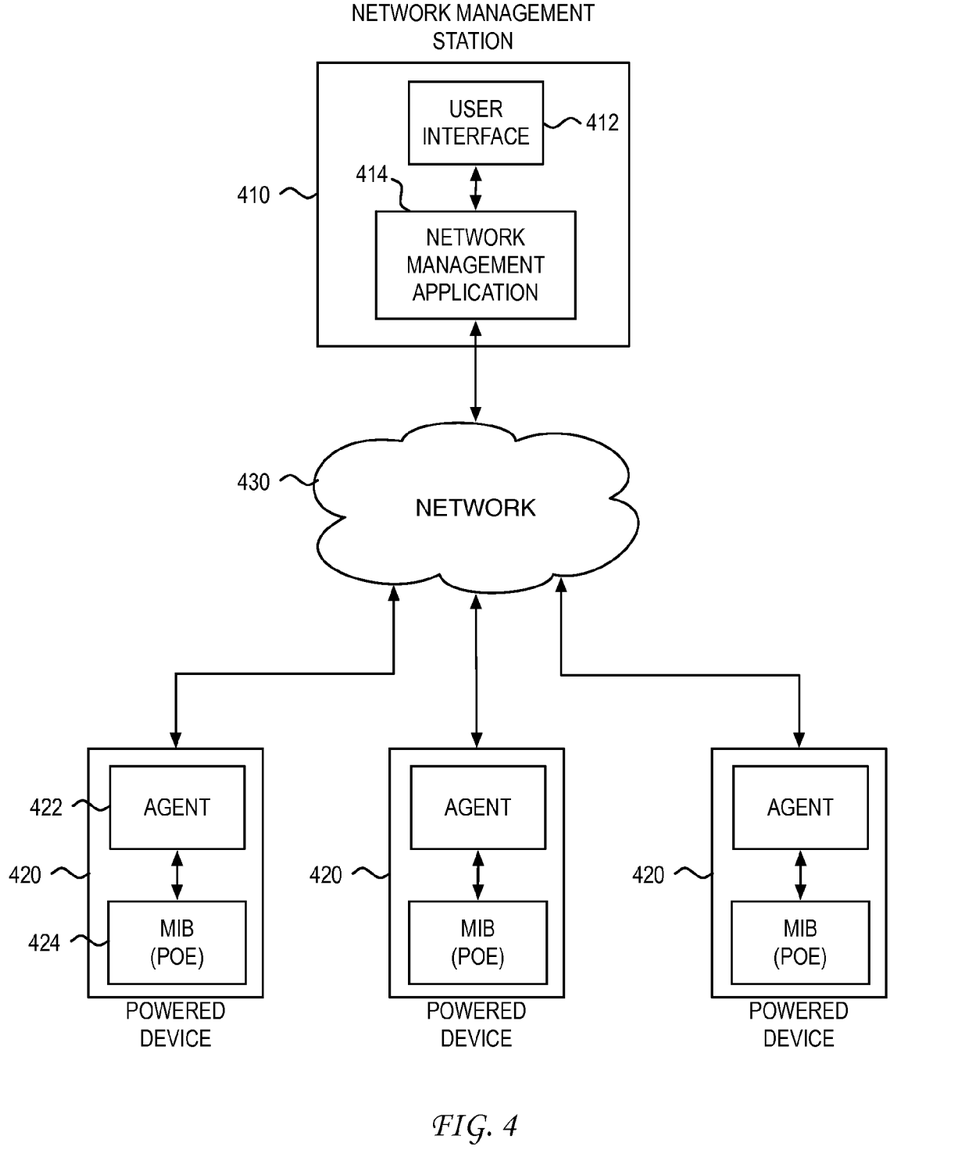
FIG. 4 illustrates an embodiment of a managed device.

In general, a managed object is a characteristic of something that can be managed. In accordance with the present invention, MIB 422 includes PoE managed objects that can be defined to represent various PoE-related parameters such as a power mode of the PD, limits or allowances for power-drawing elements in the PD, a power-related configuration of the PD, etc. The MIB at the network management station (not shown) would contain network management information extracted from the MIBs 424 of all the PDs in the PoE network.

With this management framework, agents 422 can be designed to expose management data on the respectively managed PDs as variables. As such, the network management protocol can enable active management tasks, such as modifying and applying a new configuration to a particular PD remotely over the network. With SNMP, for example, network management application 414 can retrieve information through the GET, GETNEXT and GETBULK protocol operations, or agent 422 can send data without being asked using TRAP or INFORM protocol operations. Network management application 414 can also send configuration updates or controlling requests through the SET protocol operation to actively manage a system.

It is therefore a feature of the present invention that an IT manager at a network management station can manage the individual and collective power allocation of a network of PDs in a PoE system using a network management protocol. For example, using the network management protocol, the IT manager can identify which PDs should draw more power. This additional allocation of power can be based, for example, on employee identity, position, etc. In another example, the IT manager can identify which VoIP phones can supply power to USB devices. In yet another example, the IT manager can effect load balancing in real time through a configuration/re-configuration of PDs. As would be appreciated, a variety of controls and/or configuration parameters can be effected by the IT manager over the PoE network using the network management station. The only limit of such controls/configurations is the particular collection of managed objects that reside in the MIBs of the PDs.

To illustrate the principles of the present invention, consider an example of various PoE power modes that can be defined for a VoIP phone. In one scenario, a range of power use levels such as VoIP only, VoIP plus USB powering, etc. can be defined for the VoIP phone. The software agent in the VoIP phone can then expose this power mode or configuration parameter as variables to the network management application. The network management protocol can then enable active management tasks that modify or apply a new power mode or configuration through modification of those exposed variables. Significantly, this process is effected through the application layer, thereby providing efficient, network-level controls to the network of managed devices. This is in sharp contrast to the limited scope effected by conventional Layer 1 and Layer 2 controls. In one embodiment, authentication techniques can also be used.

Figure 5:
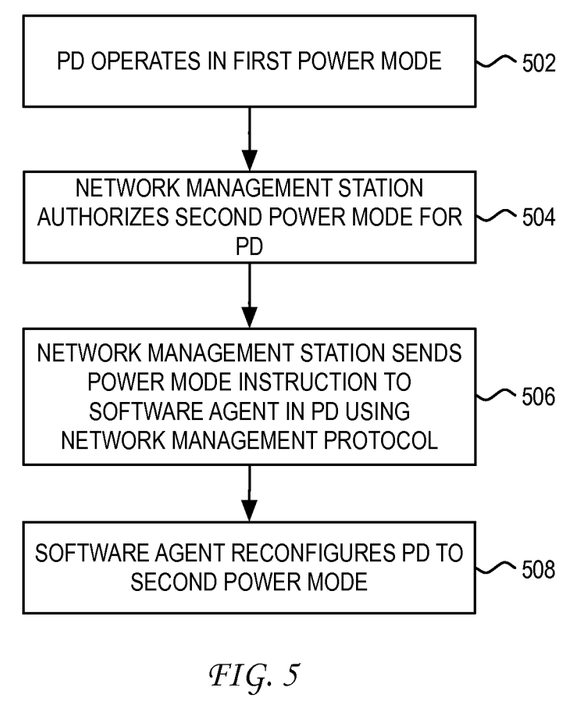
FIG. 5 illustrates a flowchart of a process of the present invention.

To further illustrate the features of the present invention, reference is now made to the flowchart of FIG. 5. As illustrated, the process begins at step 502 where a PD operates in a first power mode. As would be appreciated, this first power mode can represent an actual operating state, or any pre-configuration operating state. For example, the first power mode can represent a state where the PD has obtained an initial PoE power classification after Layer 1 classification, or a reconfigured PoE power classification using Layer 2 techniques. In another example, the first power mode can represent a state where the PD has been detected, but has not yet obtained an initial power classification.

Next, at step 504, a second power mode is authorized for the PD by a network management station. In one scenario, this authorization can be done proactively by the network management station. In one example, the authorization can be based on a profile that has been defined for the PD. In another example, an IT administrator can define, on his own initiative, an initial or new power mode for a PD. As would be appreciated, this can be part of an initial provisioning process or a reconfiguration process. In another example, the authorization for the PD by the network management station can also include power caching. In one use, the power caching can enable a reservation of power for future use based on a change in network or device condition.

In yet another example, a new power mode can be identified by the network management station automatically through a load-balancing algorithm. As would be appreciated, this load-balancing algorithm can be designed to operate autonomously to effect a network control that responds to changing network conditions (e.g., new PDs coming on line, change in status of power supplies, etc.). In another scenario, the authorization can be done in response to a user request. For example, a user can request additional power to enable powering of a USB device by the PD. Regardless of the impetus for a new power mode for the PD, the network management station can authorize such a need based on network-level considerations.

If a second power mode is authorized for the PD, then the network management station would send, at step 506, a power mode instruction to the software agent at the PD using a network management protocol at the application layer. In the example of SNMP, the network management protocol can send a SET protocol operation to the software agent at the PD. At step 508, the SET protocol operation would then be used by the software agent to change a power mode or configuration variable at the PD, thereby effecting a network control over the power configuration of the PD.

As has been described, the principles of the present invention enable the implementation of a power policy over an entire IT network. This enables an IT administrator to manage an entire network of devices from a comprehensive perspective, thereby increasing the efficiency in leveraging a fixed power source. While the above description has been directed to a network of VoIP phones, it should be noted that the principles of the present invention can be applied to a network of computing devices, such as thin PC clients. In this example, various power modes can be defined that can relate to various power parameters such as the brightness of the screen, USB power, clock speed of the CPU, etc.

It should be noted that the principles of the present invention can be applied to various networks that use standard or non-standard (e.g., 2.5 G, 5 G, etc.) link rates, as well as future link rates (e.g., 40 G, 100 G, etc.). Also, the principles of the present invention can be applied to various two-pair and four-pair PoE applications.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    operating a first of a plurality of powered devices in a first operating mode, wherein during the first operating mode, the first of the purality of powered devices receives a first level of power from a power sourcing equipment (PSE) switch device, the PSE switch device having a plurality of network ports coupled respectively to the plurality of powered devices via a corresponding plurality of network cables, wherein the first operating mode is associated with a first power configuration of the first of the plurality of powered devices, the first power configuration enabling the first of the plurality of powered devices to support both a primary function and a secondary function;
    receiving, at a software agent in the first of the plurality of powered devices, a power mode change command from a network management station device using the Simple Network Management Protocol, the network management station device located remote from the PSE switch device, wherein the power mode change command represents a proactive instruction, received prior to mode changing request generated by the first of the plurality of powered devices, that directs a change in operating mode of the first of the plurality of powered devices from the first operating mode to a second operating mode, wherein the second of operating mode provides support for the primary function but not the secondary function;
    changing, by the software agent in response to the received power change command, a power mode variable in a management information base at the first of the plurality of powered devices; and
    transitioning, in response to the change of the power mode variable, the first of the plurality of powered devices from the first operating mode to the second operating mode.

2. The method of claim 1, wherein the power mode change command is a SET operation.

3. The method of claim 1, wherein the powered device is a voice over IP phone.

4. The method of claim 3, wherein the primary function is a voice over IP phone function and the secondary function is powering of a second device by the first of the plurality of powered devices via an external port of the first of the plurality of powered devices.

5. The method of claim 1, wherein the power mode change command controls an amount of power that can be requested by the first of the plurality of powered devices.

6. The method of claim 1, wherein the management information base represents a collection of managed objects in a virtual information store that represents characteristics of the first of the plurality of powered devices that can be managed.

7. A method, comprising:
    storing a status of a level of powering of a plurality of powered devices in a first management information base accessible by a network management station device, wherein a first of the plurality of powered devices is powered by a first power sourcing equipment (PSE) switch device that provides power to a first subset of the plurality of powered devices via a first plurality of network ports, and a second of the plurality of powered devices is powered by a second PSE switch device that provides power to a second subset of the plurality of powered devices via a second plurality of network ports, wherein both the first PSE switch device and the second PSE switch device are separate from said network management station device;
    determining, by the network management station device, a change needed for the level of powering of the first of the plurality of powered devices; and
    transmitting, by the network management station device, a power mode change command using the Simple Network Management Protocol to a software agent at the first of the plurality of powered devices, wherein the power mode change command represents a proactive instruction, received prior to a mode change request generated by the first of the plurality of powered devices, that directs a change in operating mode of the first of the plurality of powered devices, wherein the power mode change command is configured to change a power mode variable in a second management information base located at the first of the plurality of powered devices, wherein the changed power mode variable restricts an amount of power that can be consumed by the first of the plurality of powered devices.

8. The method of claim 7, wherein the power mode change command is a SET operation.

9. The method of claim 7, wherein the determination is separate from the first PSE switch device.

10. The method of claim 7, wherein the determination, by the network management station device, is performed based on input provided to the network management station device via a user interface on the network management station device.

* * * * *

UNITED STATES PATENT AND TRADEMARK OFFICE
CERTIFICATE OF CORRECTION

Page 1 of 1

PATENT NO. : 9,088,434 B2
APPLICATION NO. : 12/433044
DATED : July 21, 2015
INVENTOR(S) : Diab et al.

It is certified that error appears in the above-identified patent and that said Letters Patent is hereby corrected as shown below:

In the specification

Column 5, line 67 should read:

-- mode, the first of the plurality of powered devices --

Column 6, lines 17-18 should read:

-- resents a proactive instruction, received prior to a mode
change request generated by the first of the plurality of --

Signed and Sealed this
First Day of March, 2016

Michelle K. Lee
*Director of the United States Patent and Trademark Office*